(No Model.) 2 Sheets—Sheet 1.
A. LEITELT.
MACHINE FOR SAWING STUMPS.
No. 341,667. Patented May 11, 1886.
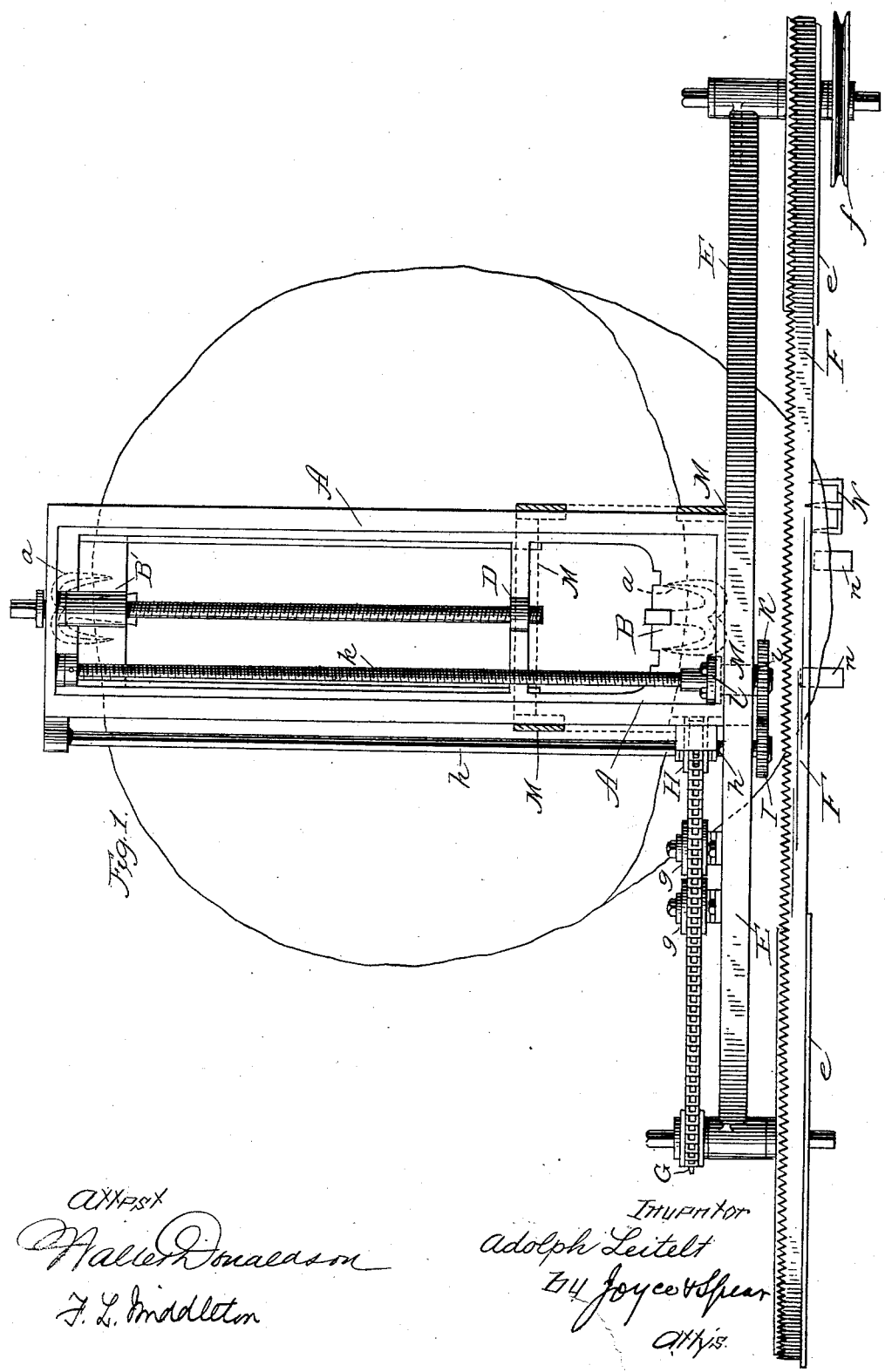

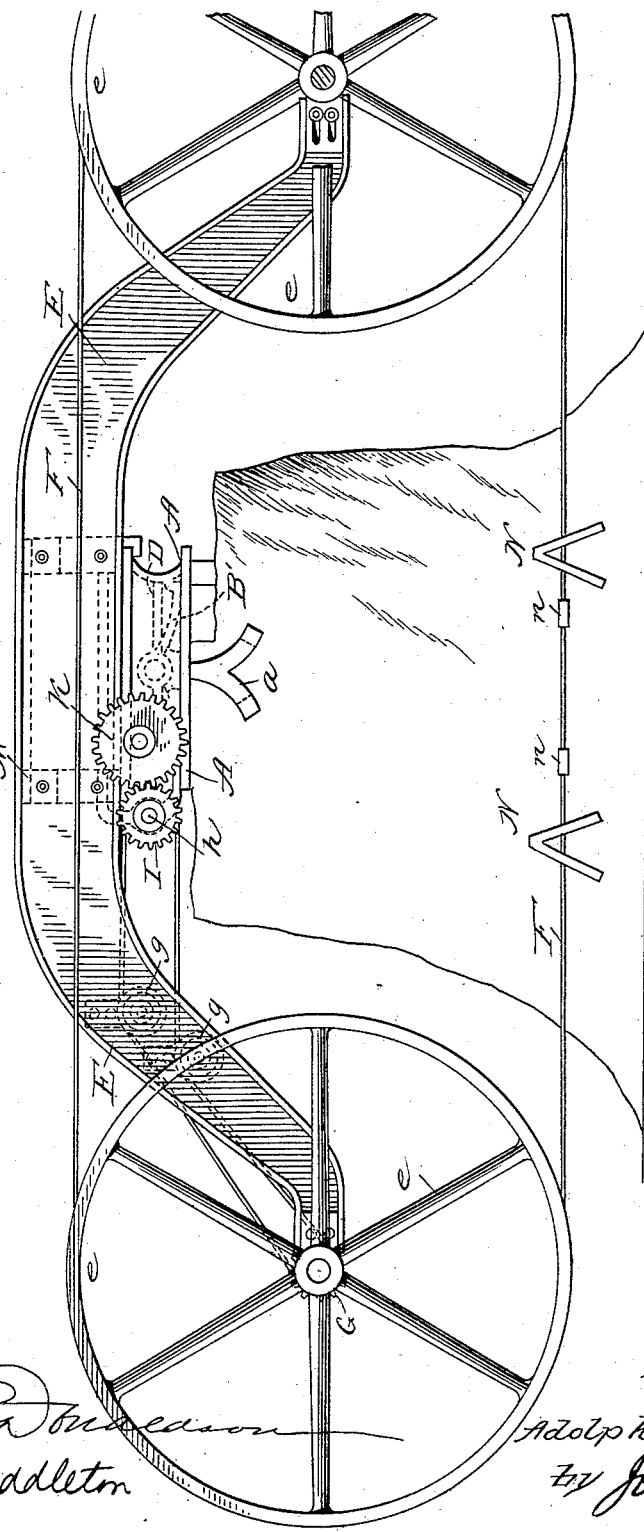

United States Patent Office.

ADOLPH LEITELT, OF GRAND RAPIDS, MICHIGAN.

MACHINE FOR SAWING STUMPS.

SPECIFICATION forming part of Letters Patent No. 341,667, dated May 11, 1886.

Application filed February 24, 1886. Serial No. 193,053. (No model.)

*To all whom it may concern:*

Be it known that I, ADOLPH LEITELT, of Grand Rapids, in the county of Kent and State of Michigan, have invented a new and useful Improvement in Machines for Sawing Stumps; and I do hereby declare that the following is a full, clear, and exact description of the same.

My invention is a machine for sawing stumps of trees, the purpose being to utilize such stumps for the manufacture of any article for which they are available.

The main features of this invention consist of a frame with clamps to attach it to the top of the stumps, a carriage moving on the frame, the base carrying band-saw and its wheel and mechanism for feeding the saw to its work, and details of construction with which I have carried out the main idea, represented in the accompanying drawings, in which—

Figure 1 is a plan view. Fig. 2 is a front elevation.

In the drawings, A represents a frame, preferably of iron, of suitable length, adapted to lie centrally across the stump of a tree. It is provided with dogs *a a*, adapted to grip the stump and hold the frame thereto. These dogs are attached to the frame. The block B, which carries the front dog, is fixed to the frame. The block B', carrying the rear dog, slides on guideways on the frame, and, while adapted to hold the frame down, is also capable of movement toward and from the front dog. It is moved by a threaded shaft, which passes through a threaded hole in the block. The shaft is attached to a cross-piece, D, of the frame so as to turn therein, and has a square outer end fitted to receive a crank, by turning which the dogs are applied or released.

To the carriage M are attached arms E E, carrying saw-wheels *e* and a band-saw, F. The shaft of one wheel has a pulley, *f*, by which power is applied. This represents any means convenient for the purpose. The arms E are bent downwardly to bring the band-saw well down upon the stump. The shaft of one band-saw wheel has a sprocket-wheel, G, fixed to its inner end, which carries an endless sprocket-chain running over idle-wheels *g g* to another sprocket-wheel, H, splined upon a shaft, *h*, extending the whole length of the frame upon one side thereof in suitable bearings fixed upon the frame. The front end of the shaft *h* carries a cog-wheel, I, which meshes into another gear, K, fixed on the nut *l*, which turns in bearings in the carriage. This nut is extended in the form of a sleeve, and is on a threaded rod, *k*, which is held in the rear end of the frame. The nut or sleeve upon which the gear *k* is fixed moves when turned upon the rod *k*, and moves the carriage with itself from one end of the frame to the other, thereby carrying the saw and feeding it constantly to its work. Reverse movement of the saw will feed the carriage back again to the front end of the frame.

In order to hold the stump in position and prevent it from settling upon the saw, and to steady it under the strain when nearly sawed off, dogs N are driven in the stumps where the work begins, and wedges *n n* may be used, if desired.

I claim as my invention—

1. A machine for sawing stumps, consisting of a frame adapted to be placed across the top of the stump, having dogs at each end to clamp it to the stump, a carriage moving longitudinally upon the frame, band-saw wheels and saw carried upon the carriage, and mechanism for moving the carriage, substantially as described.

2. The frame and its dogs at each end adapted to clamp the stump, a carriage supported upon said frame and adapted to move longitudinally thereof, having arms projecting laterally from the frame, carrying the wheels of a band-saw, a shaft, *h*, extending the length of the frame and turning in bearings therein, a sprocket-wheel splined thereon connected to and driven by a sprocket-chain from one of the band-saw wheels, a threaded shaft, *k*, and nut on said shaft turning in bearings in the carriage connected to and driven by the shaft *h*, all substantially as described.

In testimony whereof I have signed my name to this specification in the presence of two subscribing witnesses.

ADOLPH LEITELT.

Witnesses:
H. H. SHINKMAN,
K. VAN HOF.